United States Patent [19]

Martinez et al.

[11] 4,348,338
[45] Sep. 7, 1982

[54] INJECTION-TYPE PRESSURE-FREED CARBURETOR

[76] Inventors: José L. P. Martinez; Jose P. Osorio, both of Viveros de Coyoacan No. 5, Viveros de la Loma, Tlalnepantla, Mexico

[21] Appl. No.: 251,060

[22] Filed: Apr. 6, 1981

Related U.S. Application Data

[63] Continuation of Ser. No. 71,722, Aug. 31, 1979, abandoned.

[30] Foreign Application Priority Data

Oct. 18, 1978 [MX] Mexico ................................. 175349

[51] Int. Cl.³ ........................................ F02M 15/04
[52] U.S. Cl. .................................... 261/142; 123/518; 123/549; 123/557; 123/546; 123/552; 261/51; 261/144; 261/41 D; 261/69 R; 261/121 A; 261/23 A
[58] Field of Search ............... 261/144, 145, 41 D, 261/69 R, 121 A, 23 A, 142, 51; 123/518, 549, 557, 546, 552

[56] References Cited

U.S. PATENT DOCUMENTS

| 771,096 | 9/1904 | Richard. | |
|---|---|---|---|
| 1,831,522 | 11/1931 | Bastian. | |
| 2,163,522 | 6/1939 | Wehinger | 123/546 |
| 2,357,947 | 9/1944 | Gerson | 261/16 |
| 2,460,528 | 2/1949 | Oswald | 261/145 |
| 3,141,447 | 7/1964 | Jernigan | 261/16 |
| 3,762,385 | 10/1973 | Hollnagel | 261/144 |
| 3,843,338 | 10/1974 | Zonker et al. | 261/69 R |
| 4,000,224 | 12/1976 | Phelps et al. | 261/69 R |
| 4,089,314 | 5/1978 | Bernecker | 123/557 |
| 4,091,782 | 5/1978 | Dunnam | 123/557 |
| 4,106,457 | 8/1978 | Totten | 261/145 |
| 4,112,889 | 9/1978 | Harpman | 123/557 |
| 4,178,897 | 12/1979 | Strem et al. | 123/557 |
| 4,216,751 | 8/1980 | Davison et al. | 123/557 |
| 4,249,501 | 2/1981 | Ehresmann | 123/557 |

FOREIGN PATENT DOCUMENTS 52438 7/1952 Mexico.
134210 9/1976 Mexico.

Primary Examiner—Tim R. Miles
Attorney, Agent, or Firm—Armstrong, Nikaido, Marmelstein & Kubovcik

[57] ABSTRACT

A pressure feed, fuel injection carburetor including a carburetor base, a gassifier for gassifying a portion of the fuel-fed to the carburetor, a vacuum-operated shut-off valve connected to the gassifier permitting fuel flow only when vacuum is present downstream of acceleration dampers below the ventures of the carburetor, injection metering valves which are mechanically linked to the acceleration dampers for metering fuel to a pair of spray units mounted in the ventures, and an idle-speed fuel air mixture device for supplying air and fuel for idling operation of the engine attached to the carburetor. A richness sensor and adjustment apparatus can be provided between the shut-off valve and the pair of injection metering valves.

9 Claims, 19 Drawing Figures

INJECTION-TYPE PRESSURE-FREED CARBURETOR

This is a continuation of application Ser. No. 071,722, filed Aug. 31, 1979, now abandoned.

BACKGROUND OF THE INVENTION

1. Field of the Invention

This invention is related to the field of devices which supply liquid charges at their most adequate temperatures for internal combustion engines and very particularly this invention is related to a carburetor which injects fuel (gasoline) by pressure to the intake manifold of an engine.

2. Description of the Prior Art

Exhaust gas emissions from gasoline-burning internal combustion engines contain carbon monoxide and hydrocarbons, both of which are highly toxic. The volume of carbon monoxide and/or hydrocarbons exhausted basically depends upon the air/fuel mixture ratio, although spark setting, temperature and altitude above sea level, as well as engine conditions, are also important factors.

Fuel consumption and the degree of efficiency thereof are determined by engine service conditions in addition to the air/fuel mixture composition and, consequently, the exhaust gas components as well.

From this, it can be assumed that carbon monoxide poisoning, which is capable of causing illness and/or death in human beings, occurs whenever there is incomplete carbon combustion or incomplete combustion of carbon-containing products, that is, whenever carbon-containing products are not oxidized to result in carbon dioxide.

Generally, the average carbon monoxide content present in the exhaust gas of gasoline-burning internal combustion engines runs about 7%. As a rule, it can be said that, if the carbon monoxide concentration in "breathable" air does not rise over 0.01%, such air may be breathed for approximately an 8-hour period without being hazardous to the health of human beings.

A 1% (carbon monoxide) concentration in the atmosphere will result in a 50% hemoglobin concentration within 15 minutes and an 80% concentration within a 23 minute period, which constitute a lethal dose of carbon monoxide. An amount of 10.3% of carbon monoxide in the exhaust gas may be considered to be very dangerous. An average of 0.1% of carbon monoxide in the atmosphere may be tolerated for continuous breathing. Following are listed the principal components of internal combustion engine exhaust gases:

| | |
|---|---|
| CO | Carbon monoxide (poisonous) |
| $H_2$ | Hydrogen |
| $H_2O$ | Water |
| $N_2$ | Nitrogen |
| NO | Nitrogen monoxide (poisonous) |
| $O_2$ | Oxygen (whenever CO or carbon monoxide is absent) |
| $CO_2$ | Carbon Dioxide |
| CH | Diverse hydrocarbon chains (noxious) |
| Burned Oils | |

Contamination of breathable air by these gases is invariably occasioned by inadequate combustion.

Legal ordinances regarding exhaust gas composition stipulate fixed limited readings for carbon monoxide (CO), hydrocarbons (CH) and for nitrous oxides (NOX). However, the volume ratio thereof largely depends upon the air/fuel mixture ratio and, thus, directly upon the extent of emulsion formation as well.

A great many varied types of systems have been devised to reduce CO, CH and NOX readings in exhaust gases. However, if carburetion is inadequate at different engine operating conditions, at different temperatures and for different atmospheric pressures then, although the problem is being attacked, it is not being remedied.

The procedure involving injection-type, pressure-feed carburetors, which is the purpose of this invention, allows for a substantial reduction in the normal volume of fuel consumption required for adequate engine operation and of the exhaust gas carbon monoxide and hydrocarbon ratio. This is due to the proper adjustment of the injection unit, which assures adequate mixture formation at varying pressures and for varying driving and service conditions as well. Fuel volume is precisely metered by the extent of the injection valve openings whose operation, in turn, is governed by engine load, operating temperature and engine RPM.

In "cold starting" at low RPM, during acceleration and under full load, the engine receives only the required amount of fuel. This avoids mixture saturation under the entire range of operating conditions. Engine combustion is always carried out under the most favorable conditions, which avoids mixing a substantial volume of unburned fuel together with the exhaust gases.

As a result, the injection-type, pressure-feed carburetor is comparably superior to traditional, conventional types of carburetors because it has an automatic pressure-actuated "shut-off" mechanism, a mixture richness sensor, a fuel gasifying housing and injection metering valves, all of which, when taken together, supply an adequate vaporized, emulsified and proportional air/fuel spray into the engine. Additionally, inasmuch as the fuel injection control is pressure actuated, this correctly balances correctly gasified prevalent air pressure into the engine and eliminates the problem of lean mixture feed into those cylinders which are furthest from the source of supply, such as will occur with traditional carburetion systems, and even in some ordinary fuel injection systems, since these systems fail to mix fuel and air adequately.

When the cylinders receive a proper volume of correctly metered and vaporized fuel/air mixture, a more uniform distribution into the intake manifold is guaranteed (as well as into the combustion chamber), which expedites the total fuel combustion, thereby achieving more efficient and responsive engine operation under diversified operation and service conditions. As a result of optimum combustion, fuel consumption is appreciably reduced. Also, this injection-type carburetor results in a reduced amount of unburned CO and CH fractions being included in the exhaust emissions, which results in improved fuel economy. The exhaust which results from using this carburetor does not violate any of the atmospheric contamination regulations which are prevalent in many countries.

SUMMARY OF THE INVENTION

In the carburetor which is the object of this invention, not only have all component parts (such as are described in, and covered by Mexican Pat. Nos. 52,438 and 134,210 and (Mexican Patent application No. 166,631 and U.S. Patent application Ser. No. 841,115), filed Oct. 11, 1977 and now abandoned been improved upon but, as a result of the experience and research which has been included in the improved carburetor systems, a completely new technology of fuel conditioning and supply to an engine under diversified operational conditions has been achieved. This has been done by means of the following mechanisms:

An automatic pressure-actuated shut-off device (fuel flow diaphragm valve) which is actuated by means of the prevailing intake manifold pressure, as follows: As the starter motor initiates piston movement, sufficient vacuum is generated to actuate the diaphragm valve, which will allow fuel passage to the injection unit. When the engine is stopped, the mechanism shuts off.

The injection unit includes a primary injection metering valve, a complementary injection metering valve and a fuel mixture richness sensor.

The primary-injection metering valve which, by means of special ducting allows fuel flow into the engine to start the engine at a low RPM, also feeds the special fuel injection ducts during partial and full load conditions. It should be noted at this point that, when the butterfly damper is at the horizontal (or rest) position, it will be completely closed, with only the metering valve special ducts remaining open. This allows for low speed, or low RPM, fuel passage. As the butterfly damper opens progressively, the low RPM ducts will automatically close progressively as well and, conversely, the medium speed and high speed (or high RPM) ducts will initiate an opening action. Consequently, the required fuel volume, in proportion to air flow through the butterfly damper, will be metered accordingly.

This is achieved by movement of special linkages which connect the injection metering valve with the butterfly damper shaft. As will be explained hereafter, economical engine back-pressure braking is also obtained during descents, or in idling conditions, since the engine is limited to the fuel allowed by the primary injection metering valve.

The complementary injection metering valve allows fuel metering during medium and high range operation, through the second throat of the carburetor and is actuated in a similar manner to the primary valve.

The fuel mixture richness sensor includes a diaphragm valve actuated by a vacuum detected in the carburetor venturi, which permits fuel enrichment while under full load. The same sensor also functions as a speed control at different settings and altitudes. Should it fail to detect sufficient venturi vacuum, the device will only permit passage of the adequate minimum fuel required by the engine in the medium speed operational range.

It is well known in the art that cold starts constitute one of the major problems in engine operation because the engine has not reached the optimum temperature which is required for fuel evaporation. Also, because of reduced temperature, gasolines possess greater cohesiveness and, instead of an adequate spray, droplets that do not readily mix with air are thus deposited on the intake manifold and cold spots are formed. As a result, fuel which is in this state fails to achieve ignition in the combustion chamber and will perform in the same manner as if it had never reached the cylinders.

By means of an electric heating element which is built into the carburetor housing, this disadvantage has been eliminated in the injection-type, pressure-feed carburetor. The electric resistance heater heats the water in the housing itself which, in turn, heats the gasifier housing where the fuel under pressure is being held (thus bringing about gasification of from about 35 to 45%. The adequately formed fuel spray according to this system makes possible the carburetor calibration which is required in order to provide leaner fuel mixtures. At the same time, this system guarantees uniform distribution of fuel into the intake manifold and into the combustion chambers. Additionally, a duly vaporized air/fuel mixture increases the flammability potential and, by the same token, increases its efficiency.

The system which is described herein constitutes a hermetically sealed unit which prevents fuel vapor seepage out of the carburetor housing, thereby eliminating the problem of atmospheric contamination by the carburetor itself, which is a factor representing about 20% of contamination sources.

These and other objects and advantages of the present invention will become apparent to one of ordinary skill in the art upon reading the details of construction and usage as are more fully set forth below. Reference is made to the accompanying drawings forming a part hereof wherein like numerals refer to like parts throughout the several views.

BRIEF DESCRIPTION OF THE DRAWINGS

The detailed characteristics of the carburetor which is described herein as an example in this application, and which may be utilized in either six or eight-cylinder gasoline burning internal combustion engines are clearly set forth in the following description, as well as in the accompanying drawings.

Like numerals and letters are used to designate the parts noted, both in the figures illustrated and in the written descriptions thereof.

DESCRIPTION OF THE PREFERRED EMBODIMENTS

Figure 1:
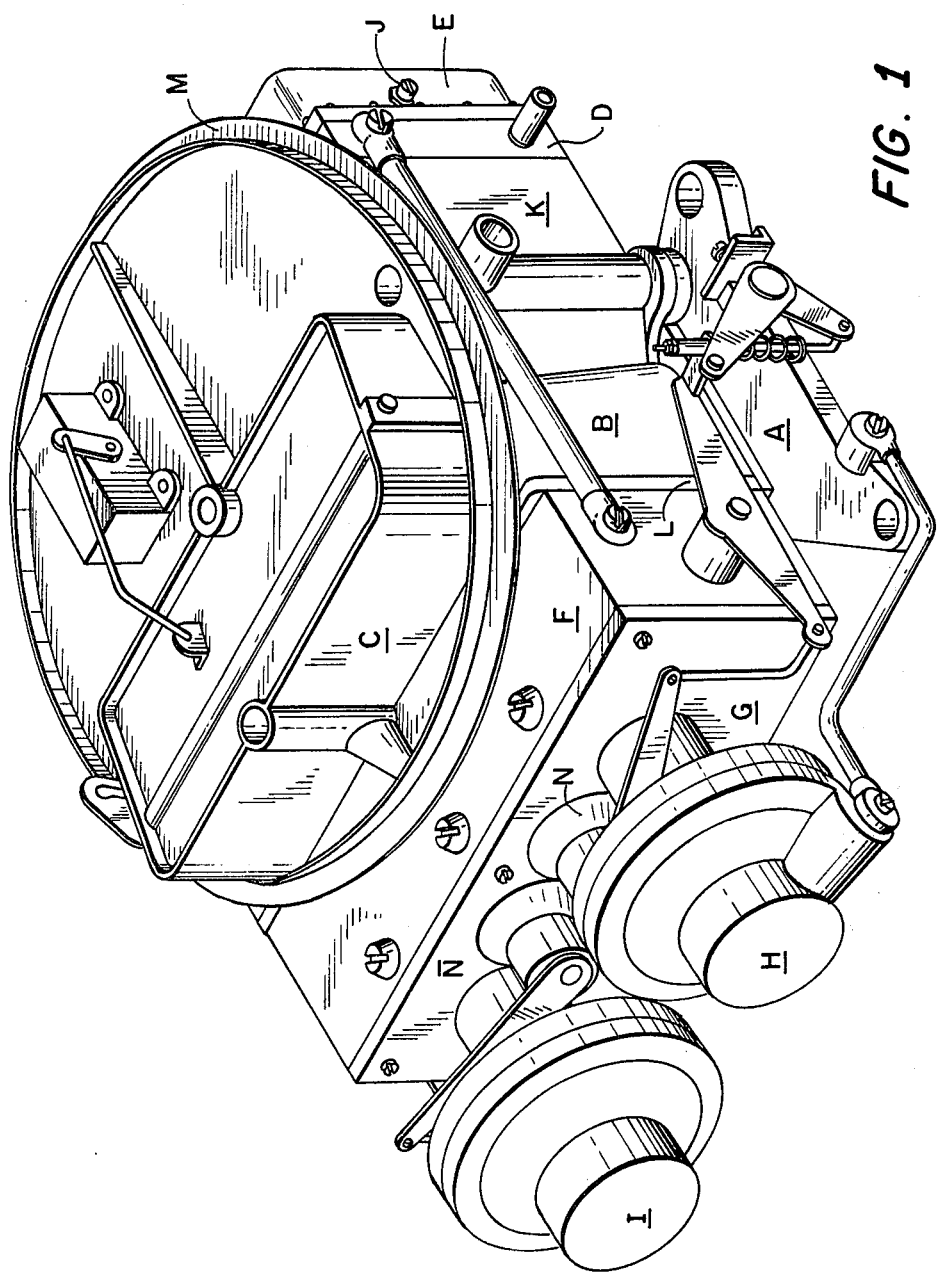
FIG. 1 is a conventional perspective view of a carburetor built according to the present invention, as seen from one side, and in which are shown the external components which are required for the operation thereof.

Prior to describing the carburetor of the present invention, it is to be understood that this invention is not limited to the particular arrangement of parts shown. It is also to be understood that the terminology used herein is for the purpose of description of the particular embodiments only, and is not intended to be limiting, the scope of the present invention being limited only by the appended claims.

Carburetor base A is shown in FIGS. 1, 2, 3 and 4. It is fixed on the engine intake manifold head and is specially shaped. It has two vertically open cylinders 1, 1' to which a stack pipe 2, 2' is attached on each side thereof, and through which passes the speed governor control shaft 3. The shaft 3 controls both of the acceleration butterfly dampers 4. Each individual damper corresponds to one of the cylindrical openings. Fins 5 and a screw 6 are positioned on one side of the stack pipes' 2-2' casing. The fin 5 and the screw 6 function as stops for the acceleration linkages 7 and for the actuating lever 8. A hollow screw 9 is positioned on the same side of the casing at a point forward of the lever 8 and connects a tube 10 with a vacuum duct 11. The tube 10 terminates at the shut-off mechanism H. The low-speed intake air fuel discharge duct 12 is located at a point between the cylinders 1, 1' by means of two extensions, abutting on the vertical cylinders 1, 1', as does also the hot engine gas discharge channel 13, which is similarly fixed by means of two extensions abutting on the cylinders 1, 1'. The air discharge orifice 14, which is used for the automatic spark advance mechanism opens through the front of cylinder 1'. Set screws 15 are used in coupling the base A onto the carburetor main housing B.

Main housing B is shown in FIGS. 2, 3, 5 and 6. It is rectangular in shape and is divided into four sections. First of all, the center section B has therein two venturi-shaped internal bores 16. The cylindrical sections 17 coincide with cylinders 1, 1' of base A to form the carburetor diffusers. The central spray units 18-18' are positioned above the venturis 16.

A cold start butterfly 19 is mounted on the main intake-air duct C, along with the shaft 20, the control lever 21 and the support bracket 22. Located in the front and center of duct C is the low-speed (idle) intake-air tube 23. Precisely opposite thereof is a support 24 which holds the air filter housing on the top of the carburetor with a special screw. An electrical microswitch 25 is provided on the circular portion M which is utilized to further support the air purifying filter. Rod 26 couples butterfly 19 to microswitch 25. Rod 27 is connected to a bimetallic thermostat 4 which is provided with an electric boost (a commonly used device) which is fixed to housing B by screws that are inserted in tapped holes 28. Borehole 29 vents the hot gases issuing from thermostat Y as far as the discharge duct 13 on base A.

The tank K contains hot water used to maintain the carburetor temperature at the required level to provide adequate fuel gasification. The water comes from the heating chamber E.

Housing B is coupled onto secondary housing F through side L. Duct 30 communicates with the slow speed intake air port 12 in base A to the opposite side of thermostat Y at a point where tube 31 is located. Tube 31 operates to vent gases coming from the fuel tank contamination control valve VII. This tube provides a gas intake 32.

Figure 2:
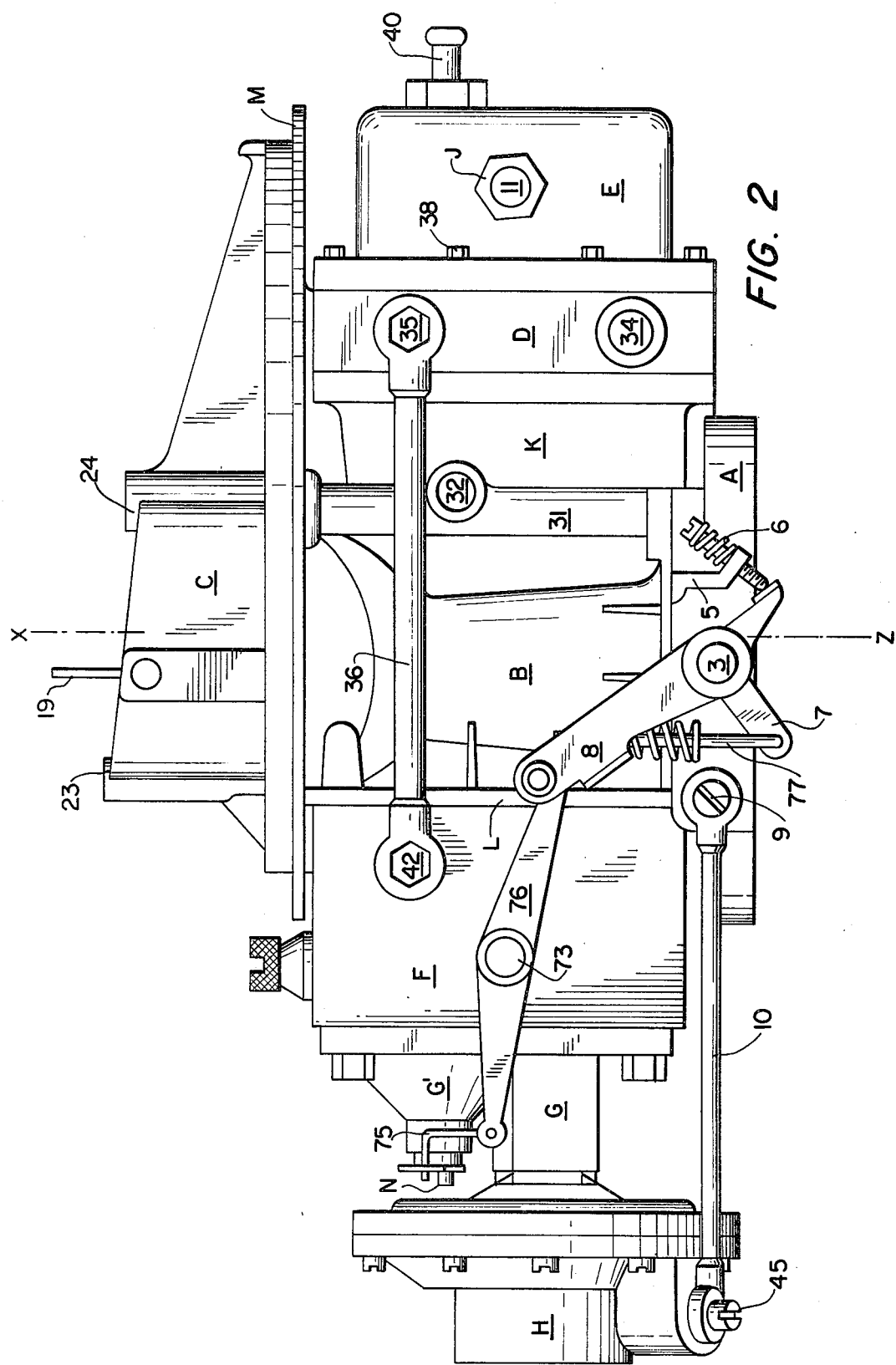
FIG. 2 is a lateral view of FIG. 1 which shows the carburetor's external components.
Figure 7:
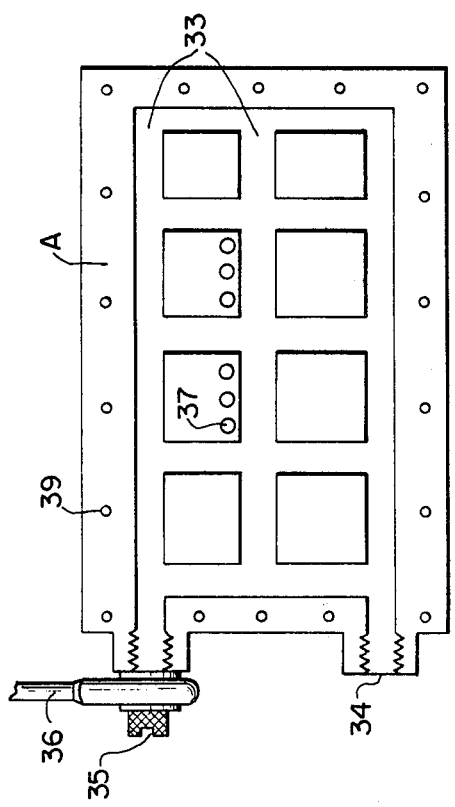
FIG. 7 is a diagramatically sectional top view showing the carburetor's interior and the gasifier housing components (D)

Gasifier housing D is shown in FIGS. 2 and 7. This rectangular-shaped housing encloses a duct network 33 which forms the fuel gasification line. Fuel is received through intake port 34 directly from the electric fuel pump III. Upon gasification of the fuel, it exits through hollow screw 35 and then flows through annular tube 36, which moves the fuel to secondary housing F. Housing D also contains small ports 37 to provide for hot water circulation of the water coming from the heating tank E. Finally, this housing is fixed onto the carburetor by means of set screws 38, passing from cover E and going through openings 39 and going entirely through the housing D.

As a result of adequate fuel gasification, this heating system provides for improved combustion and, at the same time, also guarantees a more uniform air/fuel distribution to the intake manifold and to the combustion chambers, thus providing increased operating efficiency.

Heating chamber E is shown in FIGS. 1, 2, 8 and 14. It is fixed by means of screws 38 to housing D and is used for heating the fuel passing into the engine. Water from the engine cooling system (fed into an intake tap 40) is heated in chamber E by an immersion heating element J which operates at low engine temperatures. The electric element J receives current directly from solenoid 41, which changes the signal issued by the micro-contact 25 which originates from the engine ignition switch.

Figure 10:
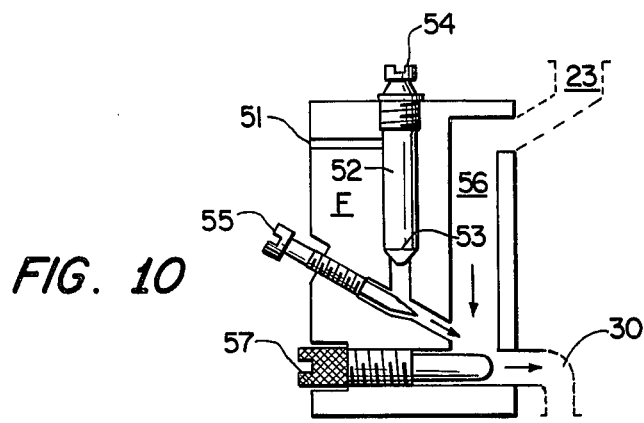
FIG. 10 is a diagrammatically sectioned lateral view of the secondary housing (F) which shows the operation, and location, of such components intervening during low speed (idle) operation.
Figure 11:
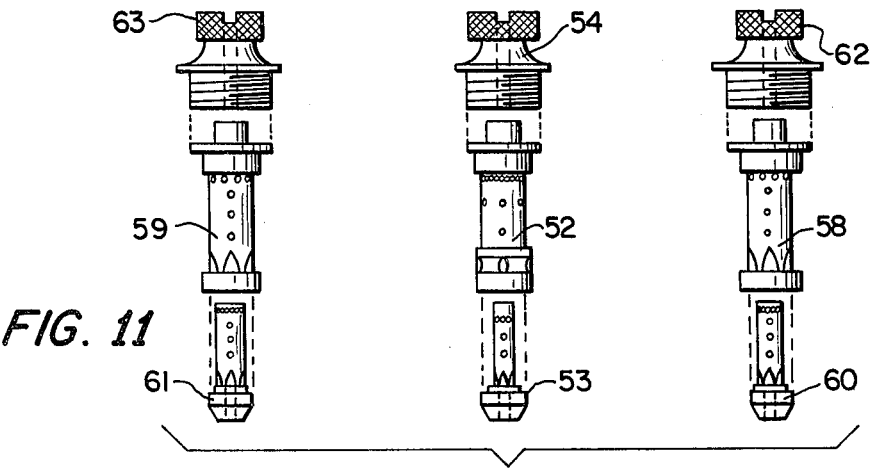
FIG. 11 is a schematic view which shows the assembly formed by the emulsifiers, terminal (stage) correctors and the air flow correctors.
Figure 9:
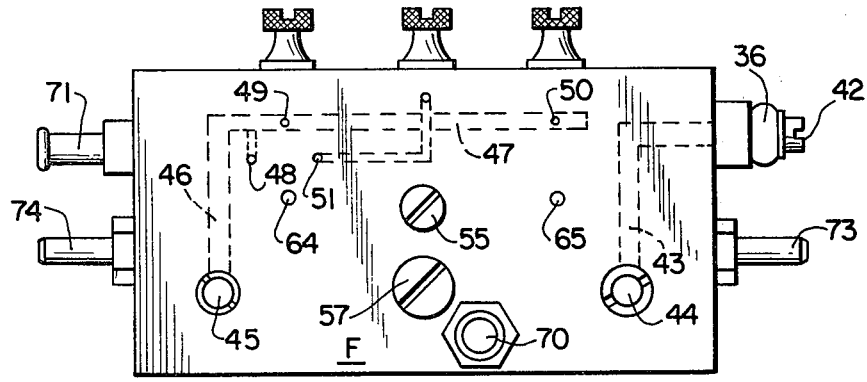
FIG. 9 is a front view which shows some of the secondary housing components (F)
Figure 10A:
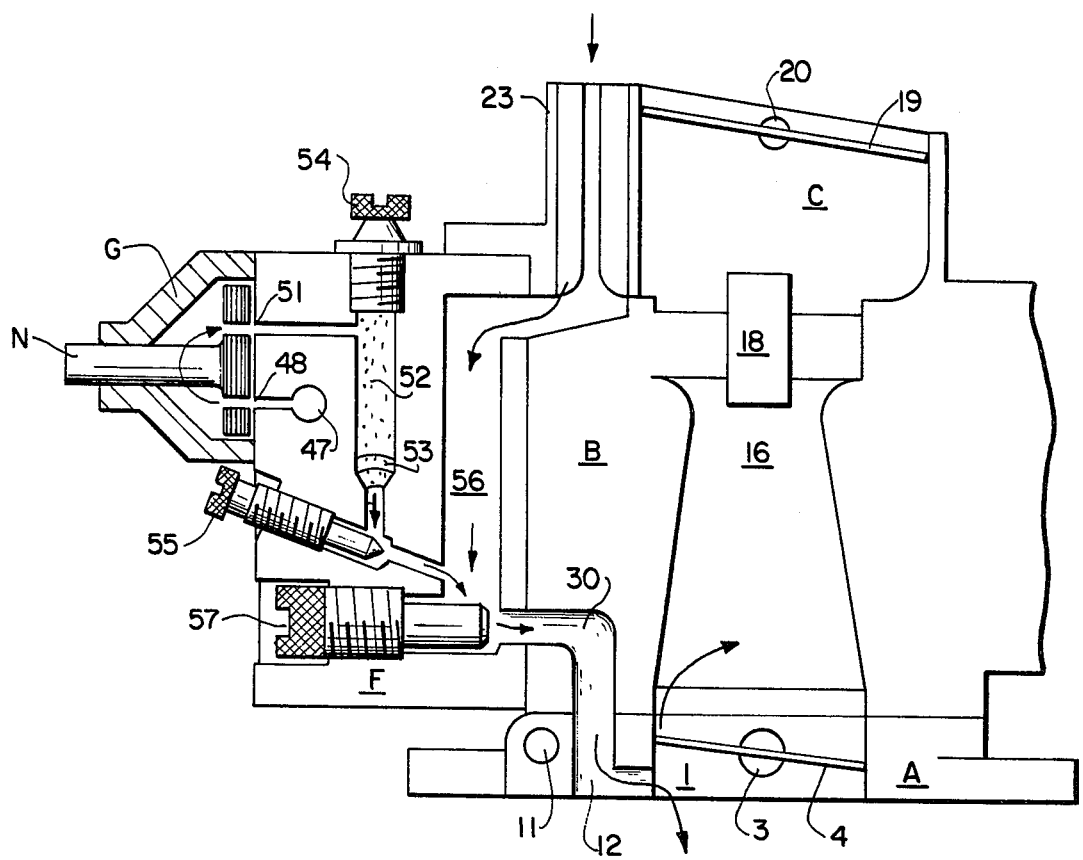
FIG. 10A is a diagrammatic cut-away view of the elements used in the low speed operation of the carburetor showing housing B, its elements, housing F, its elements and a portion of base A.

Secondary housing F is shown in FIGS. 1-3, 9, 10, 10A, 15, 16, 17 and 18. Fuel is fed into the housing F by means of a hollow screw 42 which couples with annular tubing 36. This fuel flows through the supply line 43 to the adjustment valve seat 44 used to seat the automatic pressure-actuated "shut-off" H shown as a needle operated by a diaphragm. An adjustment valve 45, located on the side opposite the valve seat 44, is used to seat the needle of the richness sensor I. Richness sensor I of valve 45 is coupled to annular conduit 46 which, in turn, connects and communicates with supply conduit 47 feeding the primary injection metering valve N through conduits 48 for low speed operation and through conduit 49 for medium and high speed operation. Fuel is fed to the complementary injection metering valve Ñ, through duct 50 From the primary valve N, the metered fuel is led by conduit 51 to the low (speed)emulsifier 52 and to the terminal corrector unit 53 (FIGS. 10A and 11). The air enrichment unit 54 supplies the required air amount in order to form the emulsion adequately. The fuel is ultimately adjusted for air mixture formation by means of an idle (low speed) adjustment screw 55. The actual mixing of air and fuel takes place within the intake air duct 56 which, in turn, is metered to the engine by means of the idle adjustment screw 57 partially blocking the bottom of duct 56 which communicates with line 30 in housing B, and thereafter to the air intake 12 of base A.

Figure 4:
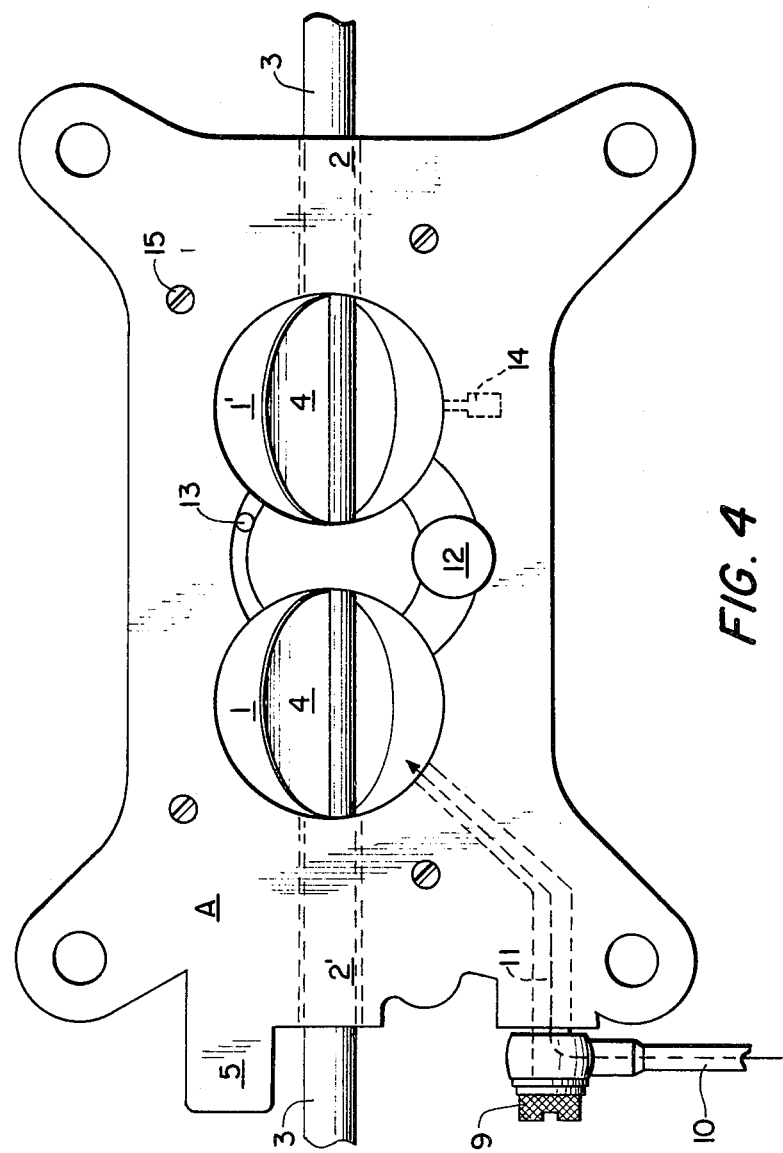
FIG. 4 is a plan view of the base (A) showing the devices included therein.
Figure 5:
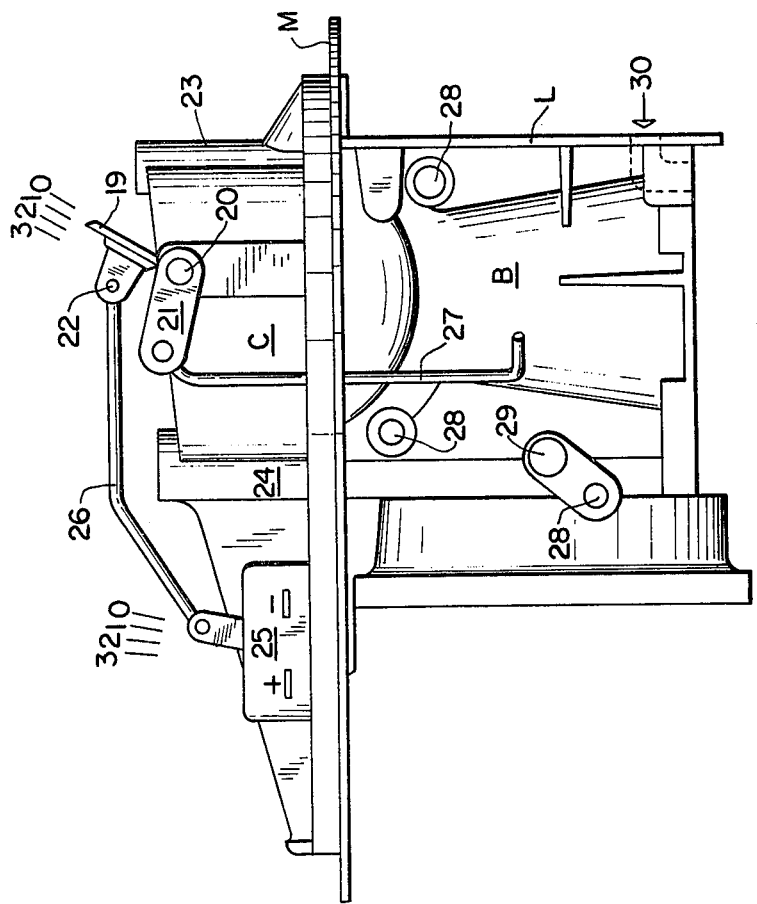
FIG. 5 is a plan view of the components forming the center section (B) of the carburetor as shown in FIG. 2.
Figure 6:
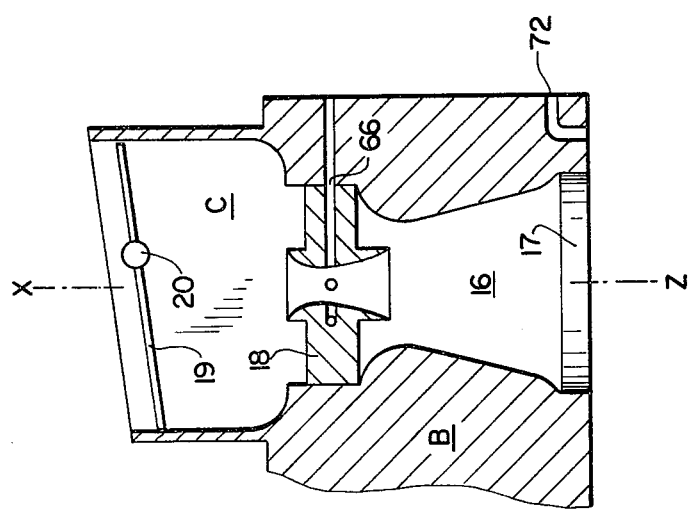
FIG. 6 is a diagrammatic sectional view which shows the interior of the center section (B) and also of the tank (C)
Figure 14:
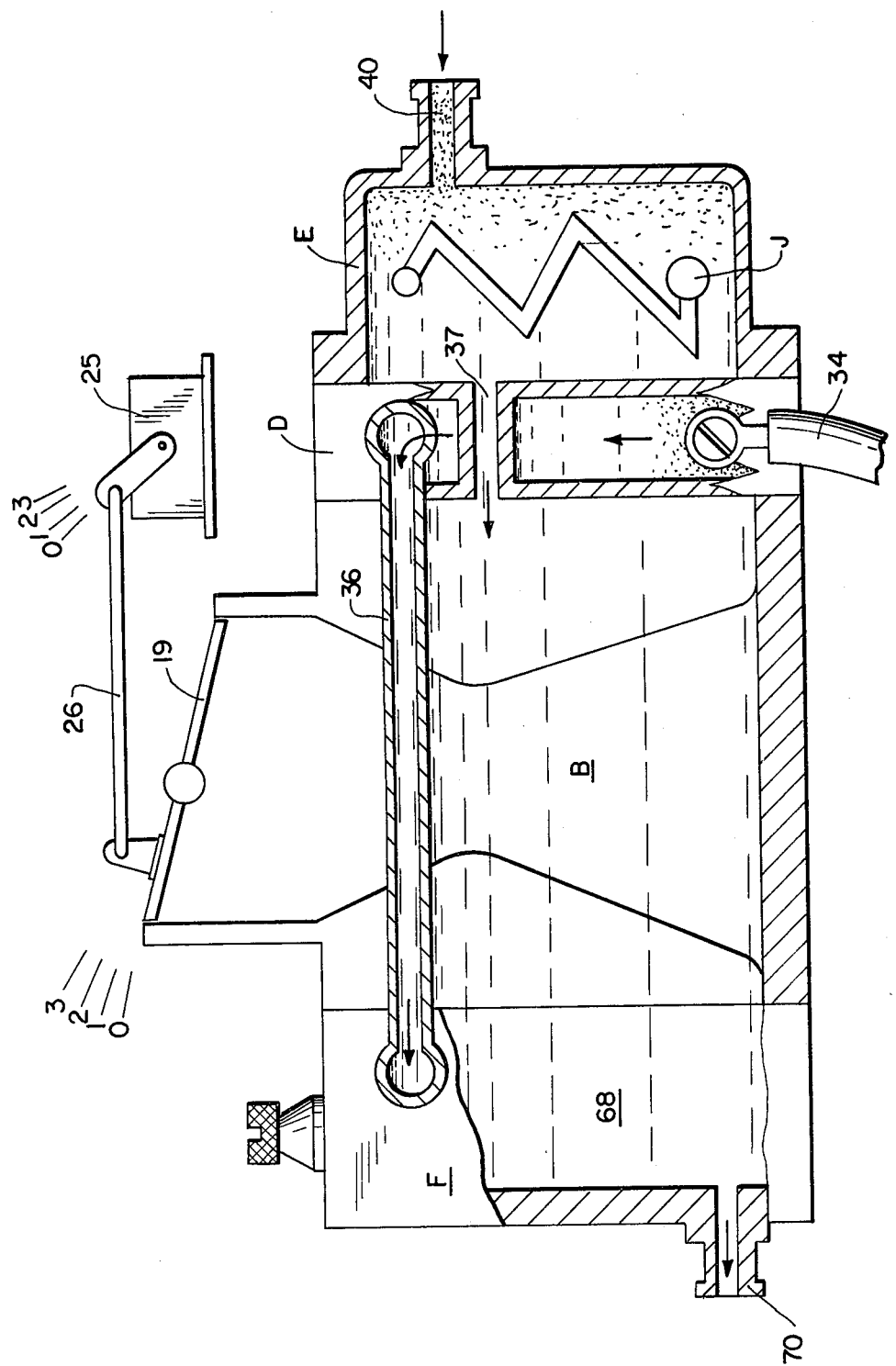
FIG. 14 is a diagram of the gasifying system operation.
Figure 16:
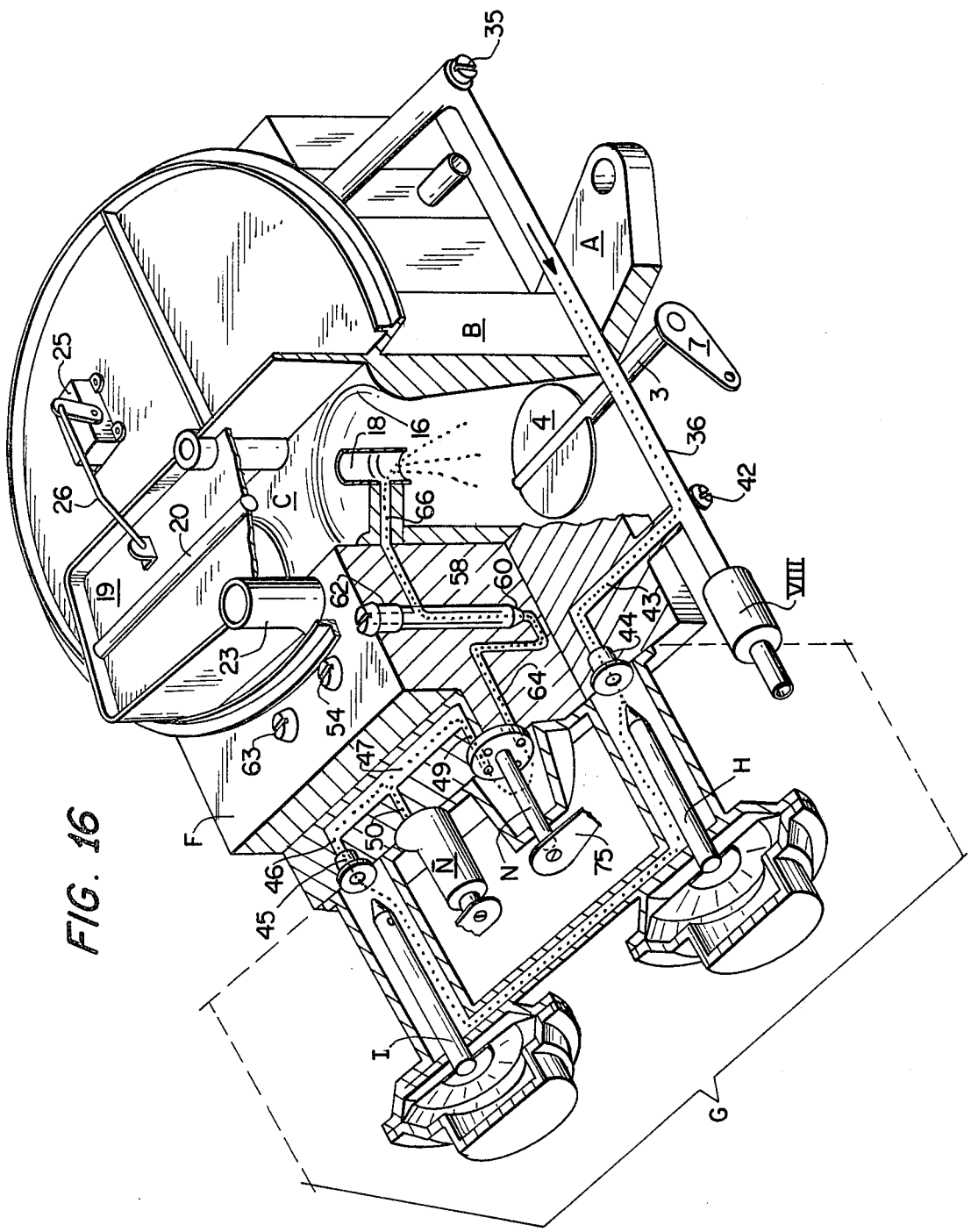
FIG. 16 is a perspective view of the carburetor showing portions cut-away and detailing components within the injection unit G.
Figure 17:
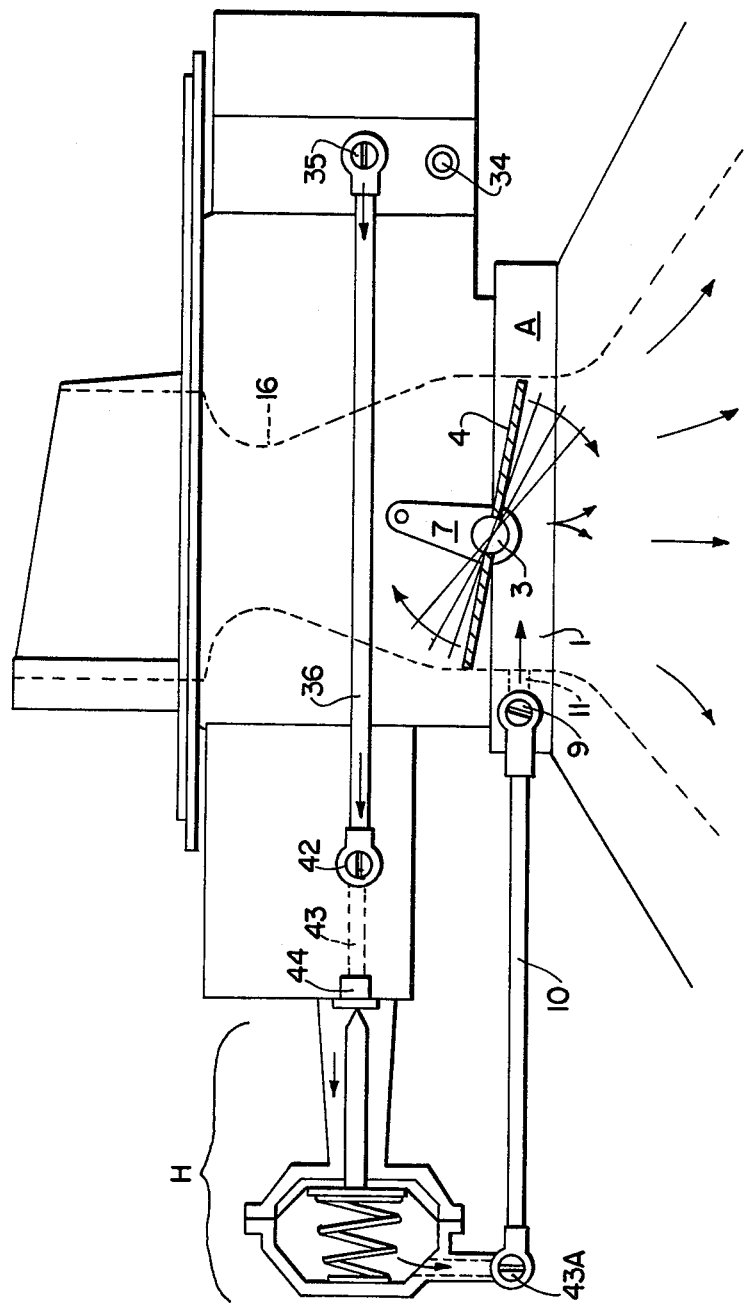
FIG. 17 is a partial diagrammatic view showing the operation of the automatic pressure-actuated "shut-off" valve H.

Fuel is fed to the intermediate and high speed range emulsifiers 58 and 59, the terminal correctors 60–61, as well as to the air enrichment units 62,63 shown in FIG. 11. The units 62 and 63 receive the fuel through apertures 64 and 65 so that, following emulsification and metering, fuel flows to the central spray units 18-18' through lines 66–67 and into the engine (FIG. 16). Heating chambers 68 and 69 are positioned along the internal wall P of housing F which contains water coming from chamber E (FIG. 14). The water is recirculated into the engine through return port 70. The conduit 71 is also located on the side through which the ignition advances, and coincides with port 72 in housing B (FIG. 6) and 14 in base A (FIG. 4). Studs 73 and 74 are positioned along the extreme sides of housing F and placed thereon are linkages 75, 75', 76 and 76' which, in turn, are connected with controls 77 and 78.

Injection unit G is shown in FIGS. 1–3, 12, 13 and 15. This injection unit, which is joined to housing BZ through secondary body F, is formed by certain basic components which include: an automatic pressure-actuated "shut-off" H (FIG. 17) which is, in fact a fuel flow control valve composed of a diaphragm and an adjusting needle, which in turn seats on the general fuel intake adjusting valve 44; richness sensor I; primary injection metering valve Ñ; and complementary injection metering valve N.

Figure 18:
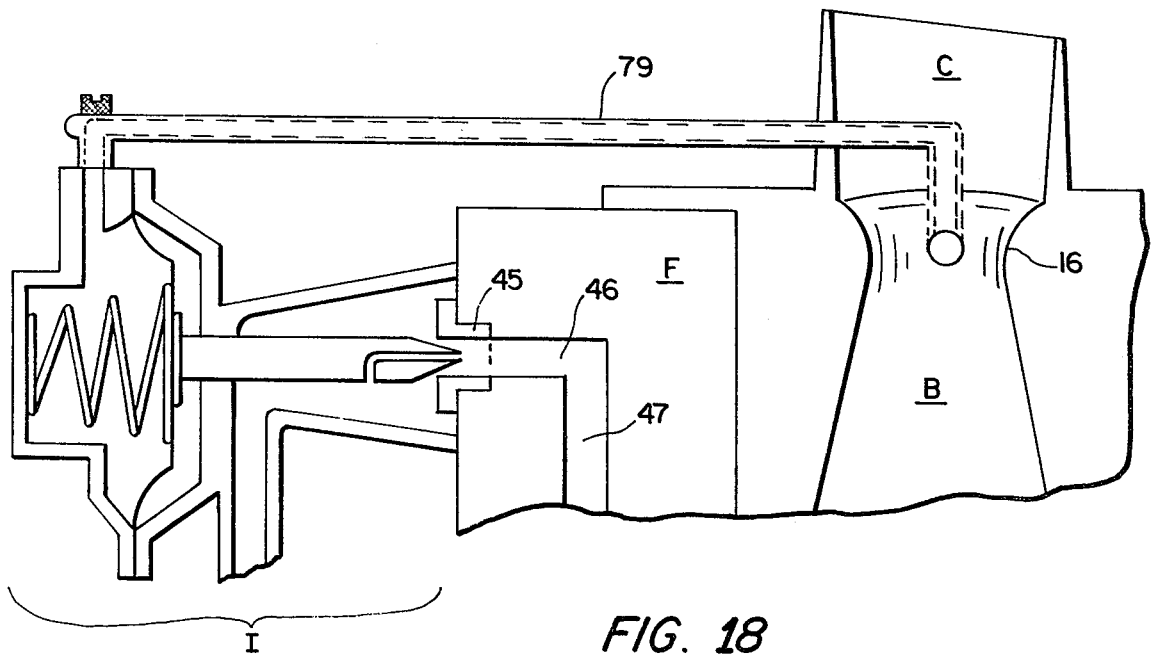
FIG. 18 is a partial diagrammatic view showing the operation of the richness sensor valve I.
Figure 13:
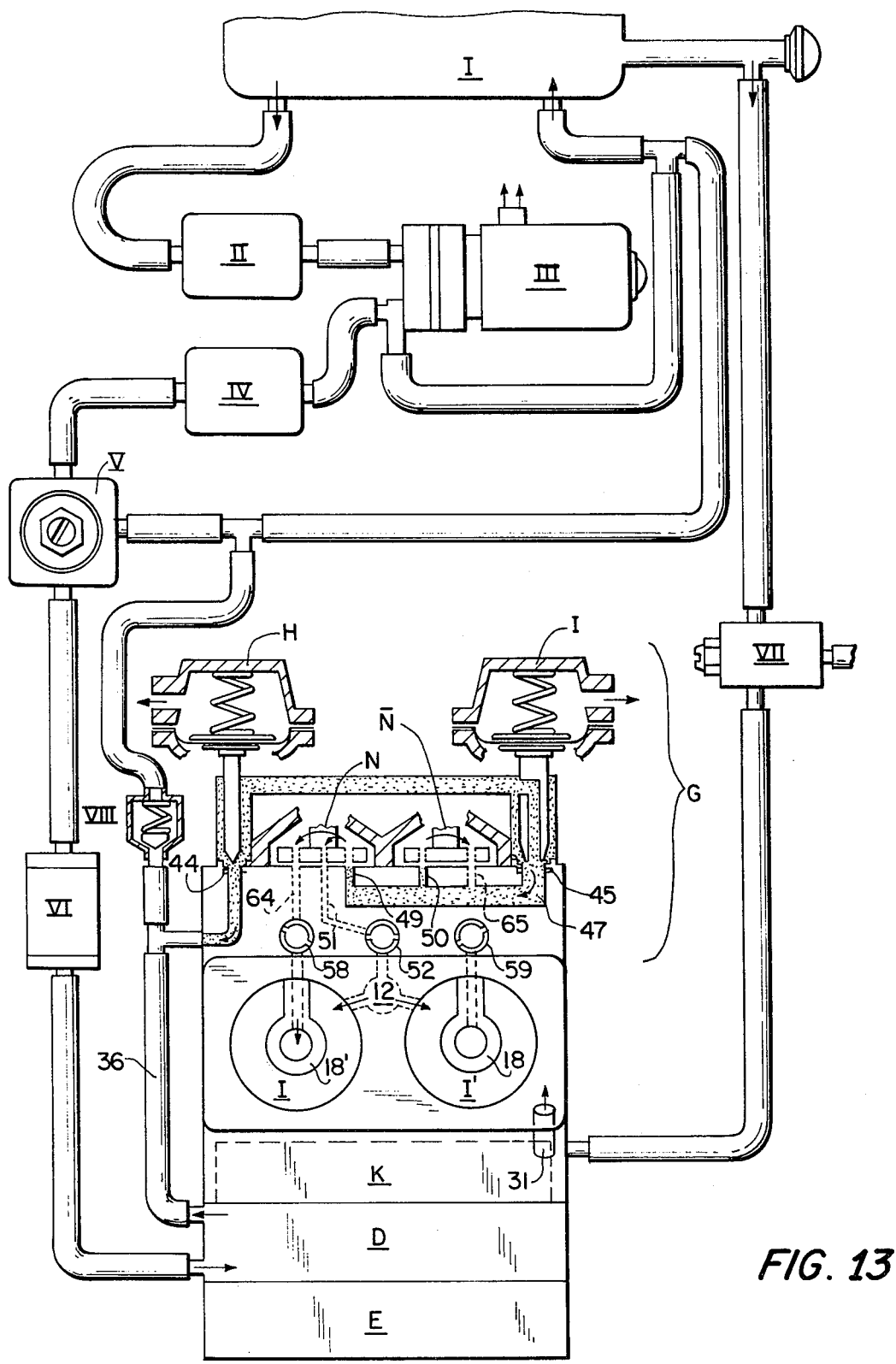
FIG. 13 is a diagram of the fuel system operation.
Figure 15:
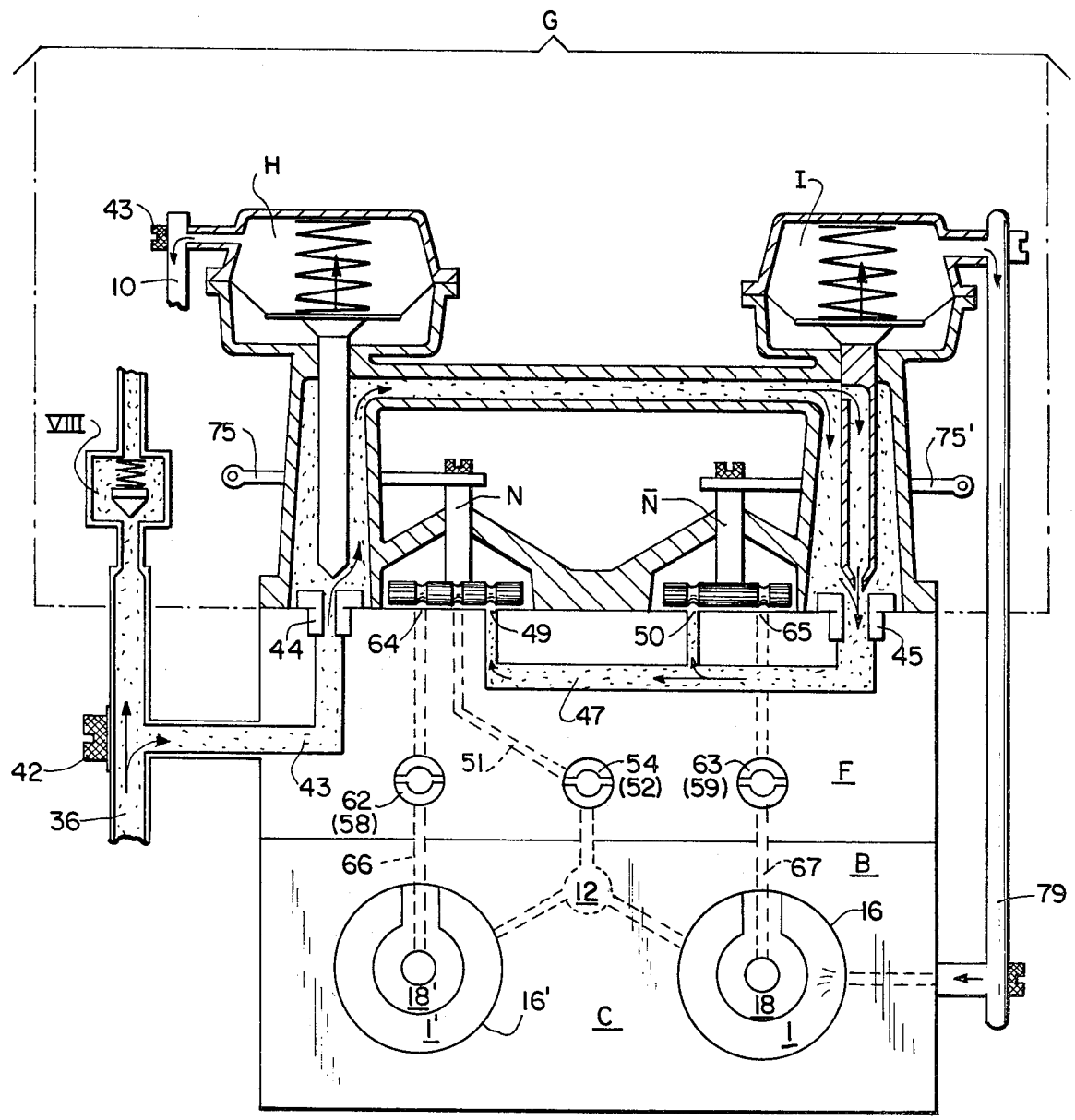
FIG. 15 is a diagrammatic cross-sectional view of the injection unit G.

The fuel richness sensor I is made up of a diaphragm and a needle with a perfectly calibrated aperture and seating rim 45 as shown in FIGS. 13 15 and 18. This needle is placed on the richness unit adjusting valve 45. The diaphram of the sensor is connected with the venturi 16 through conduit 79.

The primary injection metering valve N, which is shown in FIGS. 2, 12 13, 15 and 16, is made up of a spindle and a circular seating ring with four finely tuned flow lines.

Fuel at idle speed is metered through lines 48 and 51. This fuel flow path is replaced switching to the apertures 49 and 64 by fuel metering during single throat intermediate and full load range operation. Fuel flow is adjusted through valve N by means of the acceleration control linkages 75 and 76 and the regulator 77 that operates simultaneously with shaft 3 and speed control butterfly 4 (FIG. 12).

Figure 3:
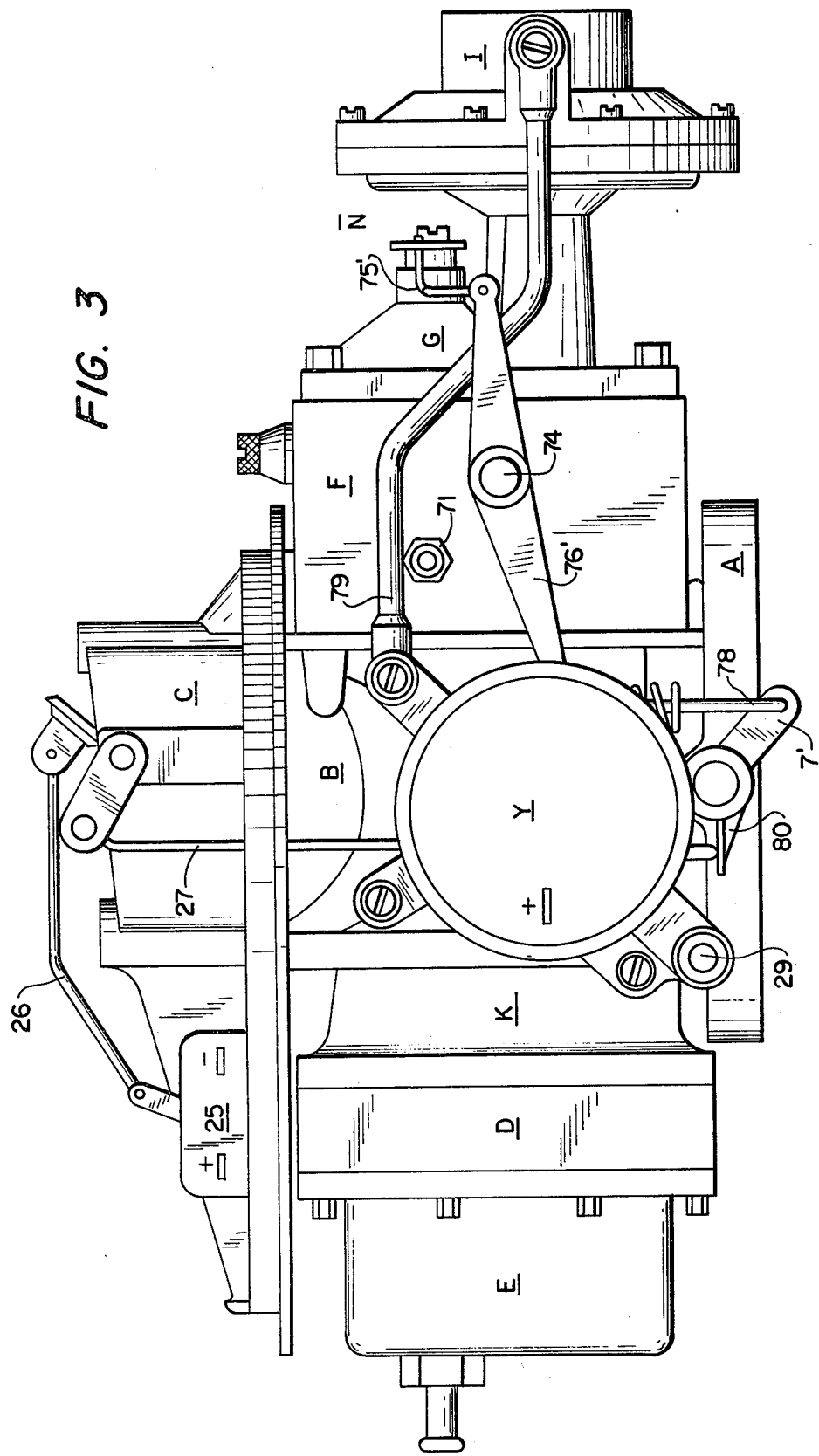
FIG. 3 is a lateral view on the side opposite that of FIG. 2 which shows the carburetor's external components.
Figure 12:
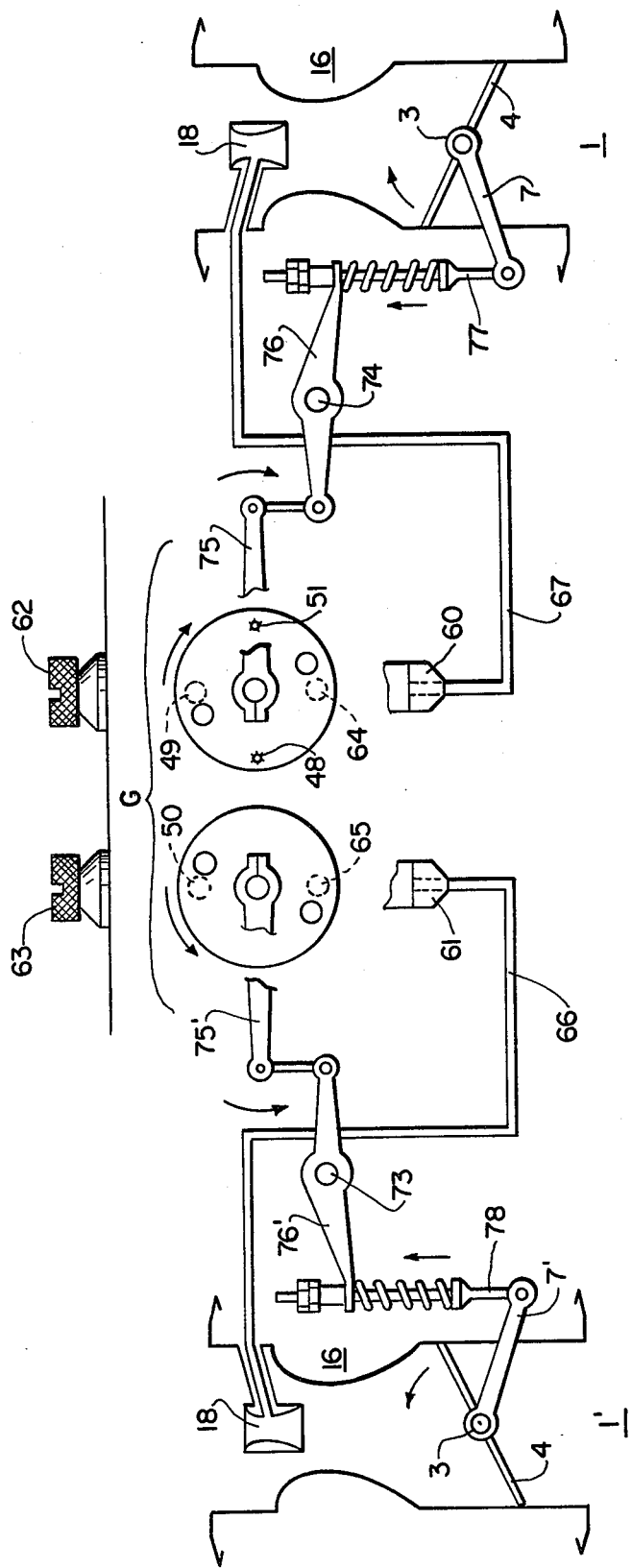
FIG. 12 is a schematic view which shows the operation of the fuel injection metering valves (N—Ñ).

The complementary injection metering valve Ñ, shown in FIGS. 12, 13 and 15, is also made up of a spindle and a circular seating ring with finely tuned flow lines 50 and 65 which meter fuel flow during the intermediate and full load operational ranges for the second throat. Valve Ñ meters fuel flow by means of the acceleration control linkages 75' and 76' and the adjustable linkage 78 which is shown in FIG. 3 and FIG. 12 and which operates simultaneously with the valve N.

This metering system permits a simultaneous and homogenous formation of the air/fuel mixture. In addition to immediate and economical acceleration control as has been previously mentioned herein, the fuel control is pressure-actuated.

OPERATIONAL DESCRIPTION

The carburetor according to this invention is designed for use in either six or eight cylinder engines, and to work equally well in either one. That this may be used in either engine serves to typify the novelty of the invention, although it is not intended to restrict the design or its application in any manner.

After installation in an internal combustion engine, the carburetor will begin to operate whenever the ignition key is turned, to thereby close the circuit to the electric fuel pump III, if necessary, and to micro-contact 25, to fuel gasifier D, heating element J, and to the electrical heating element on thermostat Y.

Fuel pump III, shown in FIG. 13, draws fuel from tank I, through filter II and forces it under pressure via a conduit through filter IV.

Pressure regulator V is positioned in advance of check valve VI and controls fuel pressure according to engine displacement and type on which the carburetor described herein may have been mounted. Gasifier housing D is coupled with annular conduit 36 by means of special connectors. Surplus fuel is returned from pressure regulator V to the tank by way of an alternate fuel line.

A fuel overflow line from the pump also leads to the tank. A excess pressure valve (not shown) is positioned thereon, and it operates whenever pressure exceeds normal readings due to pressure regulator malfunction, or whatever reason may be the cause. A check valve VI is located in advance of the gasifier housing D and keeps the operating pressure within the system from dropping immediately following the inactivation of pump III.

Discharge valve VIII, located at the end of annular conduit 36, operates whenever gasified fuel pressure markedly exceeds nominal readings, returning the excess fuel to tank I. In this manner, the carburetor is fully protected from any problems which arise from excessive pressure.

The adequately gasified fuel exits from the gasifier housing D under pressure, through annular conduit 36, as far as the adjustment valve 44. The valve 44 remains completely closed whenever the automatic pressure actuated "shut-off" H diaphragm remains inactivated.

As the starter motor initiates engine cranking, the pistons move reciprocally and develop sufficient vacuum in the intake manifold to cause diaphragm H to contract (FIG. 17), thereby allowing the fuel to flow as far as the central aperture 45 of the richness sensor I (FIGS. 13, 15 and 18). The central aperture 45 is carefully calibrated in order to allow passage of "the basic fuel charge" which is required by the engine for intermediate-range operation. This metered fuel is fed to the distribution duct 47, which is connected to the three perpendicular channels 48, 49, 50 (FIG. 9). One channel 48 is for idling speed and two 49, 50 are for intermediate and full load operation through each of the carburetor throats 1-1'.

These channels, as well as the metering valve N—Ñ, injection ducts, are closely gauged. As a result, the fuel volume dispensed is solely dependent upon the amount of opening valves N—Ñ and also the fact that fuel pressure is maintained at a constant level. The injection valve opening and thus the amount is calculated by the injection unit G according to load conditions, temperature and the pressure at which the engine must operate. This is carried out as set forth below.

The injection instant is determined according to engine RPM and the accelerator position.

The injection valve opening, that is, fuel volume administered, is determined by two basic factors: engine RPM and engine load condition.

Engine RPM is influenced by accelerator position which acts through the linkages 7, 75, 76, 77 and 7', 75', 76', 78 on valves N, $\tilde{N}$.

Load condition is influential through the prevailing intake manifold pressure and the carburetor venturi 16 pressure acting on the diaphragms of "shut-off" valve H and sensor I.

Together with the basic fuel volume, an additional and accurately measured fixed fuel volume is also required under low temperature engine starts, as well as under full load conditions.

COLD STARTS

Figure 8:
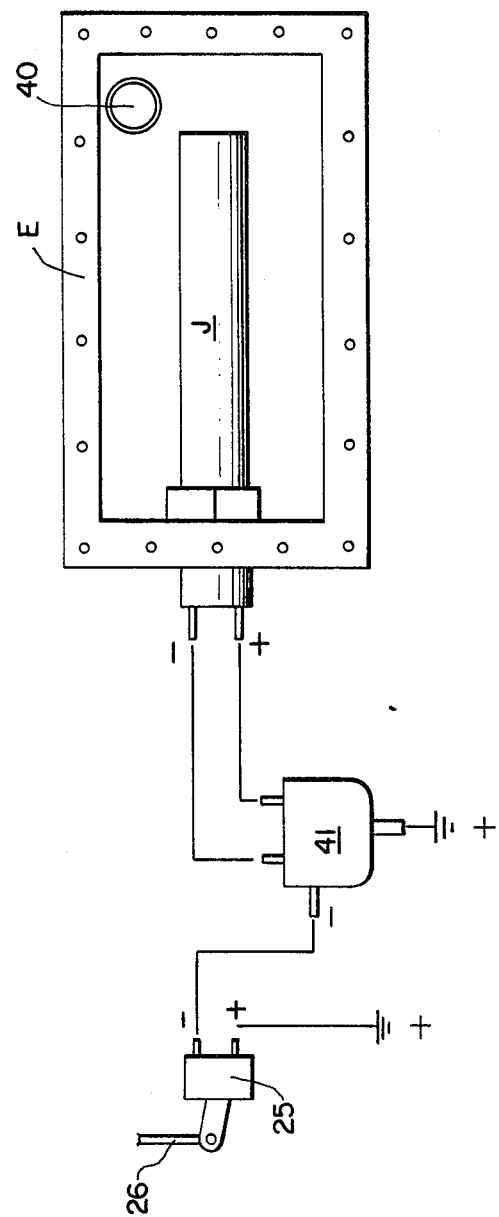
FIG. 8 is a top view which shows the heating chamber (E), the gasifier heating element (J), and the corresponding electrical circuit.

When the engine starting switch valve is activated to the "on" position as shown in FIG. 8, electric current flows to the auxiliary thermostat, electrical element. The current activates the opening of butterfly 19 until checked by stop 80, (FIG. 3) and also flows to micro-contact 25. This allows current to pass to the solenoid 41 (a commonly used apparatus) which proceeds to change the signal received into direct current. This is in order to transmit the current to the electrical resistance heater J, although this action is conditioned on the position of air intake butterfly damper 19, being either fully or partially closed, as shown in FIG. 14.

The butterfly 19 is operated by the bimetallic thermostat Y, which is extremely sensitive to temperature variations. Whenever thermostat Y is sufficiently warm, it will force butterfly 19 to remain open, thereby shutting off current to the micro-contact 25 by the leverage of arm 26. Thus, resistance heater J will cease functioning.

When the engine is cold, upon activation, resistance heater J proceeds to warm the water coming from the engine, which is stored in carburetor warm-up chamber E (FIG. 14). Both the hot water, as well as resistance heater J itself, will serve to heat the gasifier housing D's walls. The walls are manufactured from thin-walled, readily heat-conducive material, and thereby expedite the fuel gasification process and reducing the required time to a minimum. The gasifier housing D is formed with several small channels 37, through which water from chamber E passes into the interior of housing B and to secondary housing F chambers 68 and 69 and, hence, through discharge duct 70 where it returns into the engine.

Starting enrichment should only occur during low temperatures. As a result, butterfly 19 will be either partially or completely closed, and thermostat Y will activate a stop 80 (FIG. 3) in the acceleration shaft linkage 3. This mechanically determines the aperture size with regard to the metering valves N—$\tilde{N}$, which determines the minimum opening required to keep the engine running at a desired rate for cold engine operation and idle speed. After the engine heats sufficiently, the butterfly 19 and the thermostat Y open completely, thus cutting off the heater J and disconnecting the mechanical link through stop 80.

ENGINE IDLE

While at minimum engine speed operation (FIGS. 10 and 10A) (that is, at idle), damping butterflies 4 will remain completely closed. Intake air duct 56 is thus subjected to severe drawdown, which condition is used in order to obtain excellent air/fuel mixing. This adequately gasified fuel is discharged under pressure into air duct 56, near the bottom thereof, as shown in FIGS. 10 and 10A either through the distribution channel or through low-speed emulsifier 52 and terminal corrector 53. Previously, fuel and air was premixed in the emulsifier 52 by means of the air enrichment unit 54 as shown in FIGS. 10A and 11.

The engine idle end volume fuel regulating screw 55 abuts on the entrance to air duct 56 above screw 57. Screw 55 supplies fuel only when accelerator butterfly 4 is completely, or almost completely, closed (that is, only if under severe drawdown). Screw 57 is used to regulate engine idle speed at minimum carburetion operation.

As the butterflies 4 progressively open, drawdown past the idle regulating screws 55 decreases until it is insufficient for fuel flow. Two important conditions then occur simultaneously:

(1) As drawdown on spray units 18, and in the carburetor ventures 16 increases, butterflies 4 will progressively open, following which the distribution devices (or intermediate and high range emulsifiers 58 and 59), together with the terminal correctors 60–61 as shown in FIG. 11, gradually go into operation.

(2) Whenever the butterflies 4 remain completely closed, (FIGS. 10A, 12, 15 and 16) injection unit G and metering valves N-$\tilde{N}$ do not operate. This means that, while at idle, only the metering valve N adjustment ducts 48 and 51 will allow fuel passage into low speed distributor 52.

Under this condition, i.e., at idle the metering valve N, intermediate and full load conduits 49 and 64, in addition to adjustment apertures 50–65 which pertain to the intermediate and full load metering valve $\tilde{N}$, will remain completely closed also.

As butterflies 4 open progressively due to accelerator pressure on the linkages, metering valves N-$\tilde{N}$ will also gradually open. Accordingly, ducts 49, 64 and 50, 65 will allow fuel to be metered in addition to an adequate air volume to the acceleration butterflies 4. Similarly, as the acceleration process is set in motion, the metering valve N apertures 48 and 51 will shut off idle speed fuel flow.

Because the fuel is adequately metered by valves N-N and is pressure fed, instantaneous response is obtained from fuel and air entering under favorable conditions into the engine in order to accelerate immediately.

FULL LOAD OPERATIONS

Barometric conditions also exert considerable influence on carburetion. For example, it is well known that sea-level atmospheric pressure drops off in relation to altitude, and that ambient air temperature will drop by approximately 6.2° C. for each 1000 meters of altitude. These temperature and pressure variations have an influence on the air density which diminishes with the altitude, with the fuel density remaining the same. Theoretically, the carburetor mix is rich at high altitudes and lean at sea level.

In anticipation of this condition, and in order for the present carburetor to provide maximum performance at all times, a thermostatically controlled air filter must be used in connection therewith. American Motors Corporation, Ford Motor Company and General Motors have used such a component since 1968, and Chrysler Corporation has used one since 1975. This filter maintains inbound air into the carburetor which is mixed with the fuel at a minimum temperature of 100° F. (37.7° C.).

If inbound air temperature is held at this level during engine starts, then the carburetor can be set to provide a leaner fuel mix. When the temperature of a lean fuel mix (leaving the carburetor in a gaseous state) approximates the engine cooling, water temperature, efficient burning is guaranteed and is also adequate to result in approximately 25 to 35% fuel gasification.

Vehicles which are not equipped with thermostatically-controlled air filters will require richer starting (air/fuel) mixtures. A lean fuel mixture will not burn as readily when it is mixed with air at a reduced temperature. Additionally, during operation, it is easier for the injection type carburetor to adapt the formation of the fuel/air mix to the diverse operating pressures required. This is done as set forth below.

The enrichment sensing device I, which is a component of injection unit G, foresees possible mixture spareness while under full load operation. This is corrected by dispensing an additional volume of fuel to the basic fuel feed moving through the central adjusting channel of the same device I, as is shown in FIGS. 13 and 15. This occurs in relation to prevailing engine load; that is, with regard to carburetor venturi 16 pressure and also to engine RPM. Only when acceleration butterflies 4 are open and the intake air vacuum through suction duct 79 is greater than the basic fuel feed does the diaphragm of the sensing device I contract (FIG. 15). This allows for the passage of additional fuel in relation to the valve 45's diameter or setting or for equalization of fuel volume to the volume of air entering the engine. Also, the sensing device I can operate as a speed control.

For example, when climbing a steep grade, the driver of a vehicle would depress the accelerator pedal to maximum floor position, although engine RPM is progressively diminishing with a resultant slowing of the intake air velocity occurring as well. Thereafter, the sensing device I, whose diaphragm was opened and thus dispensed an additional fuel volume in keeping with the volume detected, will progressively close.

The movement of the diaphragm will be in accordance with engine RPM and air pressure reduction which will thereby restrict fuel flow volume. As a result, this forces the driver either to relax any excessive accelerator pedal pressure or to downshift in order to stabilize engine torque. In this manner, and on any occasion similar to the above-described situations, the engine will not become saturated with unburnt fuel under diverse operating conditions and will not be subjected to over-richness of the mixture.

FUEL VAPOR CONTAMINATION CONTROL

At the present time, almost all automobile manufacturers have adopted a hermetically sealed system regarding fuel tanks. These systems prevent leakage of fuel vapor into the atmosphere and avoid contamination, since leakage represents approximately 20% of atmospheric contamination sources, according to presently available statistics.

Accordingly, and in order to capture fuel vapors which evolve from the tank and which are then fed to the carburetor for engine consumption during acceleration, check valves VI, VII and VIII, as shown in FIG. 13 have been designed into the system.

Both of the aforementioned systems have been integrated in the present carburetor. The system is practical and useful in the present invention, even though vapor utilization has been refined to the extent that no vapor leaks out of the carburetor itself. The vapors are absorbed from valve VII as is shown in FIG. 13, pass through discharge tubing 31 into duct C and are thus fed directly into the engine. Also, as was previously explained, injection unit G (FIG. 15), as well as the entire system, is hermetically sealed. This guarantees either vapors, or the fuel itself, will not leak from the carburetor while the engine is at a "standstill".

The carburetor presented herein appears to be the most practical and immediate solution to the growing requirements for cost reduction. The present carburetor provides economy in a responsible and effective matter, and contributes collectively to reduction in atmospheric contamination. These advantages are provided, in addition to the very real and decisive advantages and fiscal benefits afforded the manufacturer, as well as the user of the carburetor.

The instant invention has been shown and described herein in what is believed to be the most practical and preferred embodiments thereof. It is recognized, however, that departures may be made from this disclosure which are within the scope of the invention, and that obvious modifications will occur to a person of ordinary skill in the art.

What is claimed:

1. A pressure-feed, fuel injection type carburetor comprising:

a carburetor base adapted to be connected to an intake manifold of an internal combustion engine, said base having a pair of cylindrical openings therethrough having axial centerlines, a shaft pivotally mounted in said base radially extending across both openings perpendicular to both axial centerlines, a pair of acceleration dampers fixedly mounted on said shaft in said openings and movable with said shaft, vacuum duct means in said base terminating in one of said openings downstream of said dampers, and an idle-speed fuel-air mixture duct terminating in both said openings;

a main housing connected to said base, said main housing including a pair of venturi-shaped internal bores axially aligned on the centerlines of said openings in said base;

a gasifier housing connected to one side of said main housing, said gasifier housing including a heated fluid inlet, a heated fluid outlet, a fuel inlet, a fuel outlet, means interconnecting said fuel inlet to said fuel outlet for transferring heat from a heated fluid to a fuel passing therethrough for gasifying a portion of the fuel;

a secondary housing connected to a side of said main housing opposite said gasifier housing;

pressure-actuated shut-off means mounted on said secondary housing, including a first valve seat in said secondary housing, a first needle adapted to seat on said first seat, first vacuum-operated diaphragm means mechanically connected to said first needle and operative to move said first needle towards and away from said first valve seat, conduit means interconnecting said fuel outlet of said gasifier housing and said first seat, and conduit means interconnecting said vacuum duct means in said base and said first diaphragm means, said shut-off means permitting fuel flow whenever a vacuum is present in one of said openings downstream of said dampers;

primary injection metering valve means mounted on said secondary housing and mechanically linked with one end of said pivotable shaft in said base, said primary valve means including first means for metering fuel in response to the rotational position of said shaft, and means for feeding fuel during low speed operation of the engine, said means for feeding being adapted to be progressively throttled back as said means for metering progressively opens;

complementary injection metering valve means mounted on said secondary housing and mechanically linked with the other end of said pivotable shaft in said base, said complementary valve means including second means for metering fuel in response to the rotational position of said shaft;

means for interconnecting said shut-off means with said primary valve means and said complementary valve means for fuel flow therebetween;

means in said secondary housing interconnecting said means for feeding fuel and said idle-speed fuel-air mixture duct in said base, including an idle-speed air intake duct, means for adjusting the amount of fuel entering said air intake duct, and means for regulating the amount of the resultant fuel-air mixture entering said mixture duct;

a pair of spray units, one mounted in each venturi-shaped bore;

means in said secondary housing for interconnecting said first means for metering and one of said pair of spray units; and means in said secondary housing for interconnecting said second means for metering to the other of said pair of spray units.

2. A pressure-feed, fuel-injection type carburetor as in claim 1 further characterized in that the fuel used therein is gasoline.

3. A pressure-feed, fuel-injection type carburetor as in claim 1 wherein the fuel used is selected from the group consisting of kerosene, diesel fuel and LP gas.

4. The carburetor as in claim 1 wherein said means for interconnecting said shut-off means with said primary valve means and said complementary valve means includes:

richness sensor and adjustment means mounted on said secondary housing including a second valve seat in said housing, a second needle adapted to seat on said second valve seat having a stem, a hollow bore in said stem and a port extending into said stem terminating at said hollow bore, second vacuum-operated diaphragm means mechanically connected to said second needle and operative to move said second needle towards and away from said second valve seat; and conduit means interconnecting said second diaphragm means and the interior of one of said venturi-shaped bores in the vicinity of the spray unit associated therewith.

5. The carburetor as in claim 1 wherein said means interconnecting said means for feeding and said idle-speed fuel-air mixture duct further includes emulsifier means between said means for feeding and said means for adjusting.

6. The carburetor as in claim 1 wherein each of said means for interconnecting said first means for metering and one of said spray units and said means for interconnecting said second means for metering and the other spray unit includes emulsifier means therein.

7. The carburetor as in claim 1 further comprising a fluid heating tank mounted adjacent said gasifier housing connected to said heated fluid inlet, an electrical resistance heater mounted in said tank; a butterfly damper pivotally mounted over said pair of venturi-shaped bores adapted to close off said bores, thermostat means mechanically linked to said butterfly damper to progressively open the damper when the carburetor is up to a desired temperature; and switch means electrically connected to said resistance heater and mechanically connected to said butterfly damper such that when said butterfly damper is opened fully, said resistance heater is off.

8. The carburetor as in claim 7 further comprising a heated fluid chamber interposed between said gasifier housing and said main housing and fluidly connected to the heated fluid outlet, and wherein both said main housing and said secondary housing further include heated fluid spaces defined therein for circulation of heated fluid.

9. The carburetor of any one of claims 1, 7 or 8 wherein the heated fluid is water.

* * * * *